United States Patent Office 3,539,357
Patented Nov. 10, 1970

3,539,357
METHOD OF TREATING RESIDUES OF RENDERED HIGH FAT MEAT MATERIAL
Milo Don Appleman, Los Angeles, Calif., assignor, by direct and mesne assignments, of seventy percent to Jack J. Schroeder, Long Beach, Calif., and ten percent each to Henry M. Espoy, Seal Beach, Stanisloa De Santis, Rolling Hills, and Milo Don Appleman, Sr., Los Angeles, Calif.
No Drawing. Continuation-in-part of application Ser. No. 492,854, Oct. 4, 1965. This application Sept. 1, 1966, Ser. No. 576,563
Int. Cl. A23j 1/02; A23p 1/00
U.S. Cl. 99—107        8 Claims

ABSTRACT OF THE DISCLOSURE

High temperature rendered tissue is treated with acid under controlled conditions to produce a limited breakdown of the proteins so that the tissue remains soft and pliable which upon addition of alkali to a neutral pH will resolidify rather than remain liquid.

---

This invention relates to the preparation of meat products, and relates, more particularly, to the production of meat products from high temperature rendered meat tissue. This application is a continuation-in-part of my application Ser. No. 492,854, entitled "Meat Product" and filed on Oct. 4, 1965, now abandoned.

It is conventional practice to heat meat trim and/or scraps such as scraps of beef, pork, lamb and mutton in order to obtain the fat or oil for use as lard or other products. This process, called rendering, is conducted conventionally in one of two ways. So-called low-temperature rendering of the meat trim and scraps is conducted at a maximum temperature of about 120° F. for about thirty minutes. The resulting residue product usually has between about 20 to 30% fat, about 20 to 30% protein, and the remainder water. This residue, called a low-temperature rendered meat tissue, is presently in use for dog food, and certain human foods such as sausage, among other products.

So-called high temperature rendering of meat trim and scraps is conducted at a temperature of between about 120° F. to about 212° F., usually between about 160° F. to about 212° F., and, perhaps, at pressures of the order of 40–50 p.s.i.g. for several hours. The resulting residue, so-called high temperature rendered meat tissue, has a fat content ranging generally between about 6 to 15% (but usually about 8%) and a protein content ranging generally from between 20% to 30% (but usually running about 28%). The remainder of this tissue is water.

This high temperature rendered tissue (hereafter sometimes referred to as HTR tissue) upon cooling sets up an extremely hard, rubber-like state, and up until now, has been of little or no value as a food product for man or animal. It is theorized that the cause of the extremely hard, rubber-like setting up of the tissue is caused by conversion of the protein somewhat analogous to egg albumin undergoing an irreversible change upon heating.

Inasmuch as conventionally produced HTR tissue is not considered as an edible product for man and animal and cannot be processed readily, it has up until now been considered essentially a waste product. Conventionally produced HTR tissue cannot be worked in ordinary meat processing equipment, as it will not be cut in a silent cutter or ground in an ordinary type of grinder.

Bearing in mind the foregoing, it is a major object of the present invention to produce a workable and edible product from HTR tissue by the use of a simple and inexpensive process.

It is a further object of the present invention to produce a workable, edible product from HTR tissue having varying consistencies ranging from mushy liquid to moderately hard, but readily grindable and workable in ordinary meat processing equipment, and which product is reversible to near its original physical state of solidity upon addition of chemically basic ingredients.

Yet a further object of the present invention is to produce a workable and pliable edible product from HTR tissue which is entirely suitable for both human and animal consumption.

Another object of the present invention is to produce a workable and pliable edible product of controlled consistency from HTR tissue by the addition of other additives such as high protein products, e.g., soya flour, caseinate, lipoprotein or dry skim milk.

These and other objects and advantages will become apparent from the following description:

In general, my invention comprises the heating of meat scraps and meat trim at temperatures and pressures heretofore described for high temperature rendering, to thereby produce hot HTR residue or tissue, as it is known in the trade. Preferably, while the tissue is still hot, an acid is added to the HTR tissue and stirred vigorously.

It is important to consider the stages of breakdown of the protein as a result of reaction with acid. The stages of breakdown of protein may be categorized as follows:

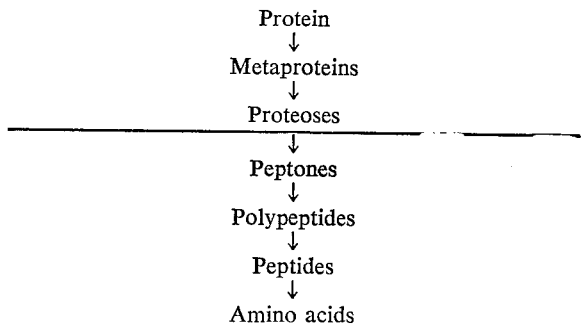

I have found that it is important to carry the acidification only to the point where the resulting meat is workable and with as little change in the original biochemical composition as possible—and, further, to produce a product that will resolidify to somewhat near its original condition upon addition of alkali.

The degree of acidification required is one which will not cause conversion of the protein beyond the proteose stage. Up to and including the proteose stage of conversion, but not beyond, the proteins are water insoluble, workable, and still retain qualities of a binder. These characteristics are all highly desirable in the ultimate products that are to be formed from the acidified HTR (and LTR) tissue. If the conversion is allowed to continue beyond the proteose stage, the resulting substances do not have the desired binding quality, and they remain liquid regardless of subsequent neutralization. For the major purposes of this invention, it is highly undesirable to have a liquid product that is non-reversible, inasmuch as the most desirable form of food for animal feeding purposes is a semi-solid form. While a liquefied form of tissue can be absorbed onto other solid or semi-solid animal food ingredients, the percentage of such liquefied tissue of the total animal food composition that may be absorbed (and still retain a semi-solid animal food) is relatively small. On the other hand, if the HTR tissue is maintained in solid, but workable, form, or if it is maintained in a liquefied state that is reversible to a semi-solid form upon neutralization, then a substantially greater amount may be incorporated into an animal food composition that is intended to be a solid or a semi-solid in its finished form.

In the prior art of which I am aware, acidification of other types of waste meat (but protein-containing products has been employed—but in all of such art, the hydrolysis of the protein continues beyond the proteose stages—generally to the polypeptide stage and beyond—so that the resulting proteinaceous product remains in a fluid form which cannot be reversed. The proteinaceous liquid product is then absorbed onto an animal feed in small percentages of the total product, i.e., 1–3%. Ruster Pat. No. 3,000,742 and Brody Pat. No. 3,113,030 are examples of such prior art. The Brody patent additionally relies on enzymatic digestion of the meat product to insure partial, but irreversible hydrolysis liquid products.

The applicant does not rely on the enzymatic activity naturally occurring within the meat tissue, because the initial step, in processing the tissue, involves an elevated temperature rendering which destroys most of the enzymes contributing to protein breakdown.

Thus, my invention comprises the use of acids, under controlled reaction conditions of time, temperature and pH, for the purpose of causing a limited breakdown of the proteins in the HTR tissue to thereby produce an HTR tissue mass that is very readily workable. Further, an HTR tissue mass is produced that remains soft and pliable upon cooling and upon standing for long periods of time, may even become liquid, and yet, upon adition of alkali, and return of the pH of the tissue towards a neutral pH (5.5–7.5), the mass resolidifies somewhat rather than remaining in liquid form.

The process of my invention comprises grinding the HTR tissue, preferably while warm or hot (i.e., 130° F.–212° F.) to which has been added, just prior to the grinding, sufficient acid to lower the pH to the level desired, normally between a pH of 1–4. The time during which reaction is allowed to proceed depends upon the temperature and pH attained. Thus, where the tissue has or attains a temperature of about 160° F. during acidification and the pH attained is about 3–3.9, the desired reaction takes place within several minutes, and thereafter the reaction rate is considerably reduced by allowing the reaction mass to cool naturally in the ambient air. It should be added that the resulting reaction is one wherein less than 50% of the protein weight in the residues has attained a water-soluble peptone (or further) breakdown, i.e., only the proteose or lesser stage of protein breakdown is primarily attained, but not to any greater extent. The proteose stage, or earlier, of protein breakdown is one wherein the protein remains water-insoluble and this characteristic of the product resulting from my process is one which is readily ascertainable by analysis.

Preferably, the acidification, as described, takes place at the elevated temperatures and within the pH limits described, so that the resulting product is of a pumpable, semi-liquid or mushy liquid consistency. The pumpable tissue may then be taken directly for admixture with other animal feed products, or may be packed in bags, or other containers, for use at a later time. In either event, cooling takes place to below 130° F. and rapidly inhibits protein conversion, so that the desired limited conversion can take place.

The storage qualities of the HTR tissue processed in accordance with my invention are excellent. The HTR acid-treated tissue can be stored without hardening at pH's of between 1 and 4 for weeks or months.

Since the amount of breakdown of protein is a function of time, temperature, and pH, it is difficult to ascribe an exact range of conditions under which the process of this invention can be practiced. It can be stated, in general, that the temperature ranges of operation fall within preferable limits of 130° F. to 212° F., the pH employed preferably falls within 1 and 4, and the time of contact of acid at elevated temperature is relatively short, e.g., on the order of minutes, and upon cooling to room temperature, the resulting product having an acidic pH is nevertheless storage-stable for extended periods of time. The important process limitation is that the residues are made much more plastic than their initial state, while a major amount of protein, or protein-breakdown substance, by weight, remains water-insoluble and is thus maintained at the proteoso stage of conversion, or earlier. As mentioned, at such a stage the binding quality of the treated tissue is excellent, and when neutralized (to between 5.5–7.5) returns to a fairly solid state, even though, initially, it may have been a pumpable liquid. Thus, a semi-moist food for animals is readily made by admixture of relatively large amounts of this treated tissue (e.g., 20–50% or more) with other alkaline ingredients.

The acidification and comminution may take place at temperatures as low as 70° F. and while the desired reaction of a limited protein conversion takes place over a longer period of time at the lower temperatures, the reaction does take place.

Organic or inorganic acids may be employed. Examples of inorganic acids are phosphoric, sulfuric and hydrochloric. Examples of organic acids employed are citric, lactic and acetic acids. It has been found that any acid that will enable an edible product to be produced can be employed.

Hydrochloric acid is presently preferred because of its low cost and because it can subsequently be neutralized by caustic soda to form a small amount of common salt (NaCl) in the mass.

A preservative, such as sodium benzoate or benzoic acid, is normally added to the HTR tissue during the acidifying step. A concentration of about 0.1% is normally employed. Sorbates, sorbic acid, propionates, propionic acid, or mixtures thereof may also be used.

The resulting HTR tissue, made in accordance with the process of my invention, is made so workable that it can be stirred, cut, formed, mixed or molded, and made into products such as dog food, frozen dog food, dog biscuit, dog kibble, imitation meats or sausages, and often foods that are edible and can be eaten by animals such as dogs, cats, poultry, or by human beings, if so desired.

Specific examples of my process, and several control examples follow. In all examples, the HTR residue is initially produced from meat scraps and meat trim heated to 180° F. for two hours under 50 p.s.i.g. pressure. The HTR tissue while still warm (130° F.) is then placed in the bowl of a silent cutter, and varying amounts of concentrated HCl (37–38% acid, sp. gravity 1.19) are added, as set forth below in Examples 1–12. The cutter is set in operation for between two and ten minutes until the reaction is complete. The reaction is considered complete when no noticeable change in consistency of the mass can be ascertained.

After such stabilization has occurred, the mass may be neutralized to a pH of between about 5.5–7.5 (as this pH level is most acceptable to human beings and animals) with a basic substance, such as caustic soda, sodium bicarbonate, or an alkaline phosphate, or may be cooled and stored for use at a later time. With the amount of alkaline substance employed for neutralization, the amount of salt (NaCl) produced is below the threshold level of taste. The phosphate also aids in the conversion of the tissue to a harder product, if this is desired.

The data and results are set forth below:

| | HTR tissue, 130° F., ounces | Conc. HCl, ounces | pH (approximate only as varies with tissue) | State of resulting product |
|---|---|---|---|---|
| Ex. 1 | 80 | 6.0 | About 1 | Mushy liquid. |
| Ex. 2 | 80 | 5.5 | About 1.3 | Mushy semi-liquid. |
| Ex. 3 | 80 | 5.0 | About 1.5 | Do. |
| Ex. 4 | 80 | 4.5 | About 1.8 | Very soft, sticky to mushy. |
| Ex. 5 | 80 | 4.0 | About 2 | Very soft, sticky. |
| Ex. 6 | 80 | 3.5 | About 2.5 | Soft, retains form. |
| Ex. 7 | 80 | 3.0 | About 3 | Moderately hard, easily grindable. |
| Ex. 8 | 80 | 2.5 | About 4 | Grindable. |
| Ex. 9 | 80 | 2.0 | About 4.2 | Moderately hard, grindable. |
| Ex. 10 | 80 | 1.5 | About 4.5 | Hard, like hard rubber. |
| Ex. 11 (control) | 80 | 1.0 | About 5.0 | Do. |
| Ex. 12 (control) | 80 | 0 | About 7 | Do. |

The acid normally contains sufficient preservative, e.g., sodium benzoate, so that the entire mass has about 0.1% concentration thereof.

As mentioned previously, the variety of acids that may be employed is large. Inorganic acids, such as hydrochloric, phosphoric or sulfuric may be employed and sufficient quantities are employed to attain a pH in the mass of between 1 and 4 for reasons previously set forth. Organic acids have been successfully employed as well, but do not presently appear as economically feasible as the inorganic acids. Acids such as citric, lactic and acetic, which can acidify the mass to a pH of about 3 or 4, are very workable, and for human consumption, may be the preferred method of operation.

In general, the organic acids are selected from a preferably unsubstituted or hydroxy substituted aliphatic straight or branched chain mono-, di-, and tri-carboxylic acids, such as acetic, lactic, fumaric, succinic, glutaric, adipic, malic, tartaric and citri. Further, generally speaking, the inorganic acids are selected from that group whose sodium or potassium salts are edible and not harmful to the human being or animal in the minor amounts retained by the HTR tissue.

The acid-treated HTR tissue may be, and is intended to be, combined in relatively large weight percentages with many other ingredients for the making of various food products. Thus, the acid-treated HTR tissue is mixed in either the fluid or plastic solid state with high protein material such as soya fluor, soya meal, dry skim milk powder, and/or sodium caseinate for the manufacture of an animal food. The proteinaceous materials raise the pH of the tissue, and, depending upon the amounts used, the final mass of material including the acidified HTR tissue sets up again to a gel, or even harder consistency. The consistency of the mass can be readily controlled by the amount of the addition of protein, as well as by the initial acidification step, as described.

As an example of a typical gel-like dog food formulation utilizing acid-treated HTR tissue, the following is set forth:

Percent by weight
HTR tissue, acid-treated (containing 0.1% sodium benzoate) _____ 35
Soya flour _____ 5
Sodium caseinate _____ 10
Dextrose _____ 22
Starch _____ 12
Propyline glycol (a humectant) _____ 6
Common salt _____ 1
Tripolyphosphate _____ 1
Dry skim milk _____ 8

Vitamins and antioxidants are also added in minor fractions of a percent proportions. The amount of acid-treated HTR tissue in animal food formulations generally varies from between 20–50%. The animal food formulations are readily prepared by admixture of about 20 to 50 parts, by weight, of the acidified and comminuted residues of low temperature and high temperature rendered meat scrap and meat trim with about 50 to 80 parts, by weight, of animal food ingredients. The pH of such animal food is preferably between about 5.5–7.5.

The foregoing description illustrates presently preferred methods of treating HTR tissue, especially for use in animal and human food. Further, the same acidification techniques herein described with HTR tissue have been successfully employed with low-temperature rendered (LTR) tissue. That is to say, acidification of LTR tissue in accordance with the heretofore described process of my invention produces a substantially more pliable and workable mass than would otherwise be the case.

The residue remaining, after the rendering of the meat trim, scraps, etc., after removal of the fats and oils, and the HTR tissue, is a heavy sludge called autogyro ejector sludge. The sludge, while hot, is flowable, but upon cooling, sets up hard and rock-like and is much like HTR tissue in this respect. The autogyro ejector sludge contains from about 14–20% protein, and is, under present practice, merely sent to waste. However, by acidifying the sludge in accordance with the process here set forth with respect to HTR tissue, a substantially workable and resettable mass is produced.

Another modification of the process includes partial or complete dehydration of the LTR or HTR tissue or autogyro sludge after the acidification, described herein, to further prevent spoilage.

Other modifications and changes will occur to those skilled in the art, and, hence, I intend to be limited only by the scope of the claims which follow.

I claim:
1. In a process for the treatment of hot residues of low temperature and high temperature rendered meat scrap and meat trim having a temperature of between 120° F. to about 212° F., the improvement which comprises:
   acidifying said hot residues to lower the pH of said residues to a pH of between about 1 and about 4 throughout said residues; and
   comminuting said acidified residues for about 2 to about 10 minutes whereby the protein of said residues is converted primarily to the water-insoluble proteose stage.

2. The process of claim 1 wherein between about 20 to 50 parts, by weight, of said acidified and comminuted residues are admixed with about 50 to 80 parts, by weight, of animal food ingredients.

3. The process of claim 1 wherein the acidifying of said residues takes place by contact of said residues with an inorganic acid whose sodium and potassium salts are edible and not harmful for human and animal consumption.

4. The process of claim 3 wherein the inorganic acid employed is hydrochloric acid.

5. The process of claim 3 wherein the inorganic acid employed is phosphoric acid.

6. The process of claim 3 wherein the inorganic acid employed is sulfuric acid.

7. The process of claim 1 wherein the acidifying of said residues takes place by contact of said residues with an organic acid selected from the group consisting of acetic, lactic, fumaric, succinic, glutaric, adipic, malic, tartaric, and citric.

8. In a process for the treatment of hot residues of rendered meat scrap and meat trim having a temperature of between about 130° F. to about 212° F., the improvement which comprises:

acidifying said hot residues, to lower the pH of said residues to a pH of between about 1 and about 4 throughout said residues;

comminuting said acidified residues at said elevated temperatures for about 2 to about 10 minutes whereby the protein of said residues is converted primarily to the water-insoluble proteose stage; and cooling said acidified and comminuted residues below 130° F.

References Cited
UNITED STATES PATENTS 2,855,309    10/1958    Anderson et al.    99—107
3,000,742    9/1961    Kuster    99—7

HYMAN LORD, Primary Examiner

U.S. Cl. X.R.

99—2,7